No. 865,455. PATENTED SEPT. 10, 1907.
J. D. TRAVIS.
CONVEYER.
APPLICATION FILED JAN. 31, 1907.
FIG_1_
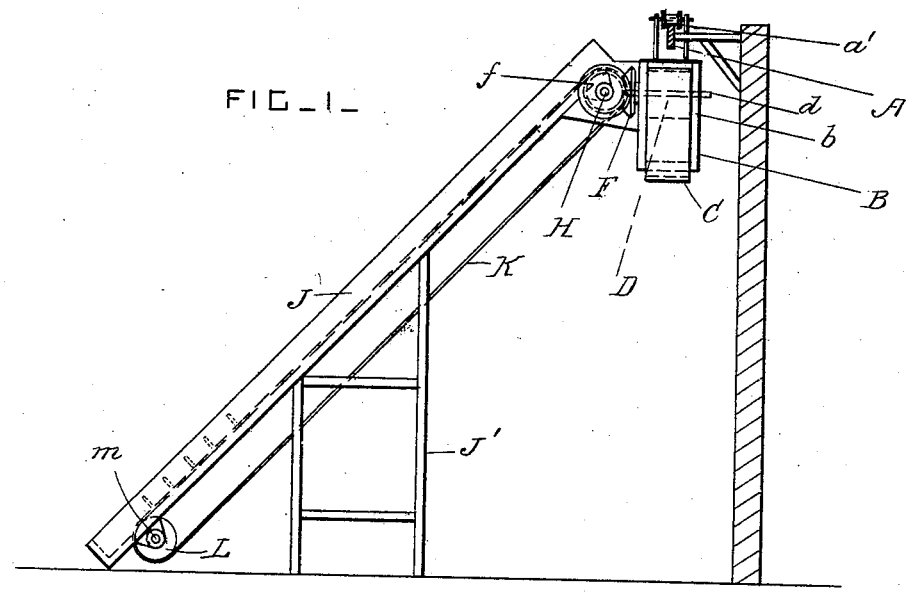
FIG_2_
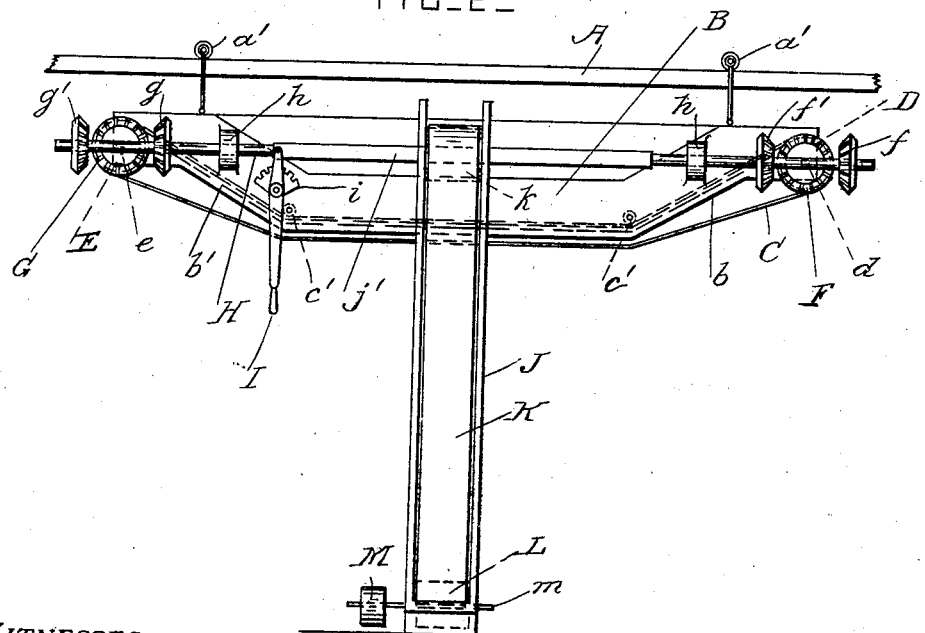
WITNESSES:
INVENTOR
Jeremiah D. Travis.
By Herbert W. Jenner.
Attorney

UNITED STATES PATENT OFFICE.

JEREMIAH D. TRAVIS, OF FAIRBURY, ILLINOIS.

CONVEYER.

No. 865,455.     Specification of Letters Patent.     Patented Sept. 10, 1907.

Application filed January 31, 1907. Serial No. 355,051.

*To all whom it may concern:*

Be it known that I, JEREMIAH D. TRAVIS, a citizen of the United States, residing at Fairbury, in the county of Livingston and State of Illinois, have invented certain new and useful Improvements in Conveyers; and I do hereby declare the following to be a full, clear, and exact description of the invention, such as will enable others skilled in the art to which it appertains to make and use the same.

This invention relates to conveying mechanism adapted to receive grain from carts and to discharge the grain into the cribs of a barn; and it consists in the novel construction and combination of the parts hereinafter fully described and claimed.

In the drawings, Figure 1 is a side view of the conveying and elevating mechanism. Fig. 2 is a front view of the same.

A is an overhead supporting track of any approved construction, which is secured in the barn in any approved manner. B is a distributing conveyer trough which is suspended by runners $a'$ from the said track, and provided with upwardly and outwardly inclined end portions $b$ and $b'$. C is an endless conveyer belt or apron arranged with its upper bight in the said trough and with its lower bight below the bottom of the trough. D and E are the driving wheels or drums at the ends of the said conveyer. These driving wheels are mounted on shafts $d$ and $e$ respectively, and these shafts are journaled in suitable bearings at the upper end portions of the parts $b$ and $b'$. Suitable guide rollers $c'$ are provided inside the trough for depressing the upper bight of the conveyer apron.

F is a beveled toothed wheel secured on the shaft $d$, and G is a beveled toothed wheel secured on the shaft $e$.

H is a longitudinal driving shaft which is journaled in bearings $h$ secured to the trough, and which is free to slide longitudinally to a limited extent in the said bearings. The middle portion $j'$ of the shaft H is square for the greater parts of its length, the parts of the shafts which revolve and slide in the said bearings being circular.

Two beveled wheels $f$ and $f'$ are secured on one end portion of the shaft H for gearing into the wheel F. Two beveled toothed wheels $g$ and $g'$ are secured on the other end portion of the shaft H for gearing into the wheel G. When the shaft H is slid longitudinally in its bearings in one direction the wheels $f$ and $g$ gear into the wheels F and G, and the conveyer is driven in one direction. When the shaft H is slid in the other direction to place the wheels $f'$ and $g'$ into gear with the wheels F and G, the conveyer is driven in the opposite direction. The conveyer remains stationary when the wheels are in their middle positions as shown in the drawings.

I is a lever pivoted to the conveyer trough and operatively connected with the shaft H, so that the said shaft can be slid longitudinally in its bearings. A notched plate $i$ is provided for the said lever to engage with so as to hold the shaft in any of its positions.

J is an inclined elevator trough which is supported by the frame J′ or in any other approved manner. This elevator trough is arranged at a right-angle to the conveyer trough and at any desired part of its length. K is an endless elevator belt or apron arranged in the said trough J. The upper end of the apron K passes over a drum or driving wheel $k$ which is provided with a square hole so that it may engage with the square part $j'$ of the shaft H. This construction permits the shaft H to be slid longitudinally without sliding the elevator, and it also permits the conveyer trough to be slid upon its supporting track longitudinally so as to suit the cribs of the barn. The elevator drum may however be connected to the shaft H in any other approved manner which will permit the said drum to revolve the said shaft, and which will permit of the requisite sliding movement of the shaft and conveyer trough. The lower end portion of the elevator apron K is mounted on a driving wheel or drum L secured upon a shaft $m$. M is a driving pulley secured on the shaft $m$. The lower end of the elevator is driven by a horse-power, a gasolene engine, or any other approved driving device. The grain or other material is discharged upon the lower end portion of the elevator, and the said grain is raised by the elevator belt and is discharged into the said conveyer trough. The conveyer apron in the said trough distributes the grain to the right or to the left as required. Both ends of the conveyer apron are driven positively, and the conveyer trough may be slid longitudinally of its supporting track A and secured in any desired position with respect to the elevator trough, so as to suit the cribs of the barn.

What I claim is:

1. The combination, with an elevator provided with an endless apron, of a conveyer arranged at a right-angle to the said elevator and also provided with an endless apron, a beveled toothed wheel at each end of the said conveyer for driving it, a longitudinally slidable shaft driven by the said elevator, and beveled toothed wheels secured in pairs on the end portions of the said shaft and slidable with it into and out of gear with the aforesaid beveled wheels.

2. The combination, with an elevator provided with an endless apron, of a conveyer trough arranged at a right angle to the said elevator and at the upper end thereof and provided with upwardly and outwardly inclined end portions, an endless conveyer apron working in the said conveyer trough, driving devices provided with beveled toothed wheels for driving each end of the said conveyer apron, a longitudinally slidable shaft driven by the upper end portion of the said elevator, and beveled toothed driving wheels arranged in pairs and secured on the opposite end portions of the said slidable shaft and movable into and out of engagement with the aforesaid beveled wheels.

3. The combination, with an elevator provided with an endless apron and a driving drum at the upper end of the said apron having a square hole, of a conveyer arranged at a right angle to the said elevator, a longitudinal driving shaft having a square portion which is slidable in the hole of the said driving drum, and reversible driving devices operatively connecting both end portions of the said shaft with the respective end portions of the said conveyer.

In testimony whereof I have affixed my signature in the presence of two witnesses.

JEREMIAH D. TRAVIS.

Witnesses:
W. H. YOUNGER,
A. L. McKEE.